(No Model.)

W. C. THOMPSON.
COTTON PLANTER AND CULTIVATOR.

No. 263,248. Patented Aug. 22, 1882.

Attest:
C. G. Miller
Chr. Benkert

Inventor
Washington C. Thompson
per T. Van Kannel & Co
att'ys.

(No Model.) 2 Sheets—Sheet 2.
W. C. THOMPSON.
COTTON PLANTER AND CULTIVATOR.
No. 263,248. Patented Aug. 22, 1882.
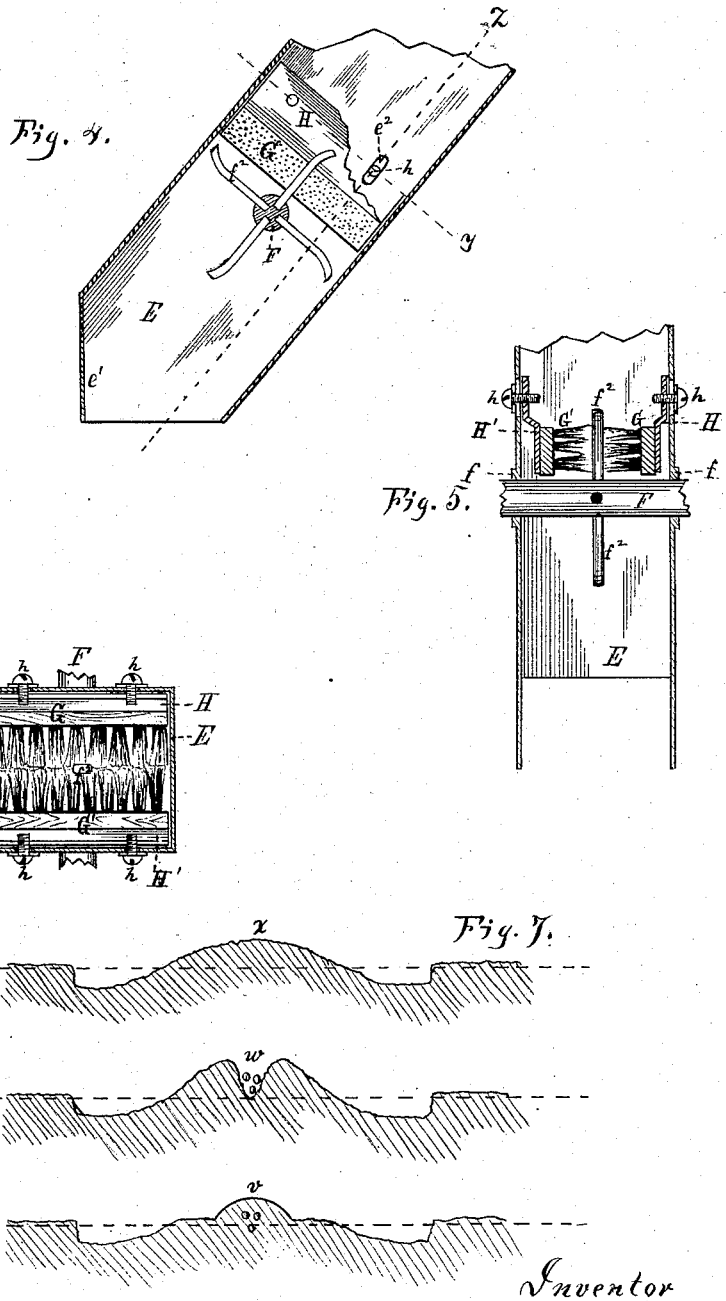
Attest:
C. G. Miller
Ch. Benkert
Inventor
Washington C. Thompson
for T. Van Kannel & Co
Attys ically set forth and claimed.
UNITED STATES PATENT OFFICE.

WASHINGTON C. THOMPSON, OF COVINGTON, KENTUCKY.

COTTON PLANTER AND CULTIVATOR.

SPECIFICATION forming part of Letters Patent No. 263,248, dated August 22, 1882.

Application filed January 6, 1882. (No model.)

*To all whom it may concern:*

Be it known that I, WASHINGTON C. THOMPSON, of Covington, county of Kenton, and State of Kentucky, have invented a new and useful Improved Cotton Planter and Cultivator; and I do hereby declare that the following is a full, clear, and exact description of the same, reference being had to the annexed drawings, making a part of this specification.

Figure 1:
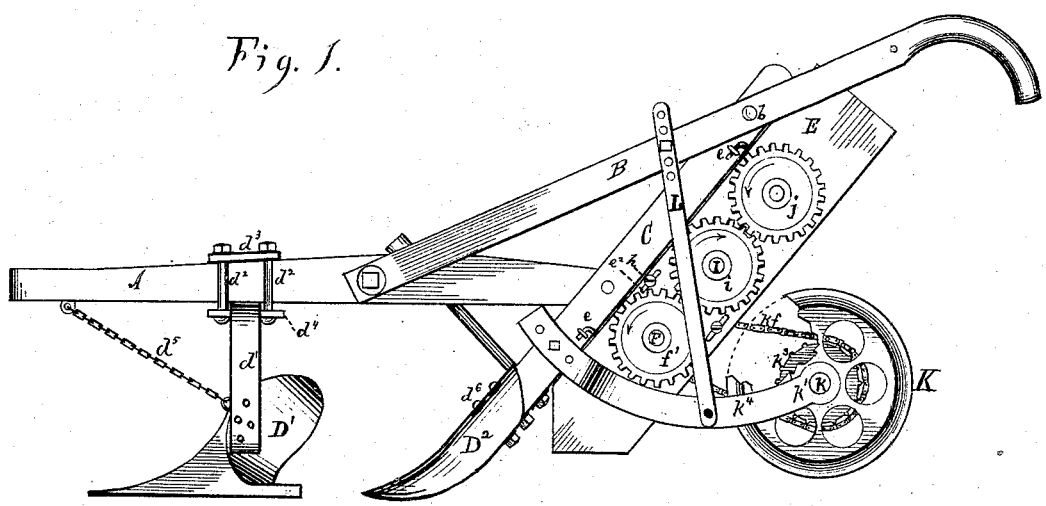
Figure 2:
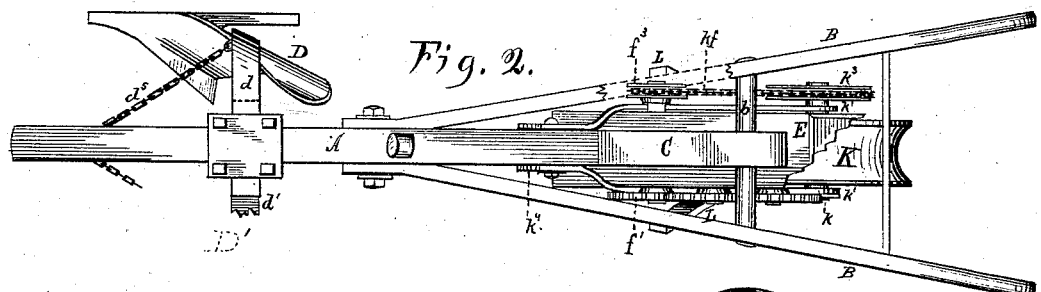
Figure 3:
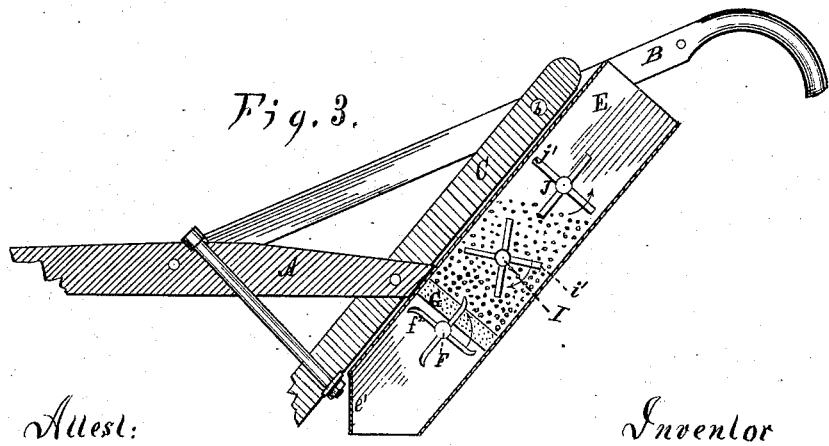

Figure 1, Sheet I, is a side elevation. Fig. 2 is a plan of the same. Fig. 3 is a partial vertical longitudinal section. Fig. 4, Sheet II, is a vertical section taken from front to back of the feeder. Fig. 5 is a longitudinal section of the feeder, taken in line $z$ of Fig. 4. Fig. 6 is a transverse section of the same, taken in line $y$ of Fig. 4; and Fig. 7 represents sections of a furrow in various stages of completion.

Similar letters of reference indicate like parts.

This invention relates to cotton-planters; and it consists in the construction and combination of parts hereinafter particularly set forth and claimed.

In construction my invention is as follows:

A is the beam, formed similar to that of an ordinary plow. B B are handles extending from the beam back to where they are connected to upright C by the round $b$. Then they are curved downward, as shown in Fig. 1. A little forward of upright C, and one at each side of the beam, are situated two single-mold-board plows, D and D'. From them extend bow-shaped bars $d$ $d'$, which pass under the beam, one overlapping the other, and both are tightly bound to the beam by means of bolts $d^2$, passing through draw-plates $d^3$ $d^4$. To each bar $d$ and $d'$, and near the mold-boards, a strong chain, $d^5$, is attached, while the other end is fastened to the clevis or the beam well forward, the chains thus acting as efficient stays for the two plows. To the lower end of the upright or post C is fastened the blade of a shovel-plow, D², being arranged with slots, through which bolts $d^6$ pass to admit of a vertical adjustment.

The dropping device consists of a large rectangular seed-receptacle or seed-box, E, fastened to and parallel with the rear of post C by means of clasps $e$ or otherwise. The lower end of box E is narrowed at $e'$, as shown, so as to confine the dropping seed within the furrow.

At F is seen a shaft passing laterally through the lower part of box E, rotating in suitable journal-bearings, $f$. On the end of the shaft, to the left and just outside of box E, is attached a gear-wheel, $f'$, and to the right, also outside box E, is attached a sprocket-wheel or chain-wheel, $f^3$, engaging with an endless chain. Within the box shaft F is provided with a series of radial arms, $f^2$, placed in a single concentric row. These arms pass between the adjoining surfaces of two flat brushes, G G', which are permanently fastened to the two adjusting-plates H H'. These plates are made to fill the transverse section of box E with the assistance of the brushes, so as to form a floor or bottom in the seed-receptacle E. Screws $h$ $h'$, passing through slots $e^2$ in box E, are screwed into the upturned portions of plates H. This allows plates H and the brushes attached thereto to be adjusted vertically and to be tightened by the screws at any desired point.

The relative position of the brushes with respect to the free ends of radial arms $f^2$ is such that the latter rise some distance above the upper edges of the former, so that in their passage they grasp a given number of seeds and force the same between the two adjoining brushes, releasing the seeds below. By adjusting the brushes as above set forth the arms $f^2$ in their movement will draw in a greater or less number of grains, as may be desired.

At I is seen a shaft, just above shaft F, having a gear-wheel, $i$, engaging with wheel $f'$. Within box E shaft I is provided with one or more concentric rows of arms, $i'$, which, when rotated, agitate the contents of box E in an efficient manner.

At J is another agitator constructed and operating like the one just mentioned, and receiving motion from wheel $i$ to wheel $j$.

A greater or less number of agitators may be used; or the number of arms as well as the speed of the several agitators may be varied to suit varying conditions.

The covering and rolling device consists of a roller, K, having its periphery made concave, which, being rolled over the furrowed ridge, covers the earth in and leaves it with a smooth crowned bead. The traction resulting from the weight of the roller being drawn over the ground is sufficient to give motion to the agitators and the feeder above described.

The shaft $k$, passing through roller K, is permanently fastened therein and rotates in journal-bearings $k'$ $k'$, which form the extremity of the two arms $k^4$ $k^4$. To the right-hand end of shaft $k$ is attached the pronged chain-wheel $k^3$. An endless chain, $k$ $f$, connects wheels $k^3$ and $f^3$, whereby rotary motion is transmitted from the former to the latter. The arms $k^4$ are held to post C by a bolt, and are braced vertically by two bars, L, extending from the handles B, to which they are fastened by removable bolts. As the bars L are provided with a series of bolt-holes, the roller can thereby be adjusted vertically with respect to the frame of the implement. Each of the arms $k^4$ is provided with a longitudinal series of holes, any one of which may receive the bolt that attaches it to upright C. This construction allows the said arms to be adjusted backward or forward to correspond to the vertical adjustment of bars L.

The operation of the machine is as follows: Seed being placed in the receptacle E and all the parts adjusted properly, the planter as it proceeds first throws up a ridge, as seen at $x$ in Fig. 7, and as the shovel $D^2$ is passed through at a less depth it forms a suitably-deep groove, as seen at $w$, into which the cotton-seed is dropped by the planting device, as already described, while the covering is done by roller K, as above set forth, leaving the completed furrow as seen at $v$.

From the construction of my improved device for agitating and feeding irregular-shaped objects I am enabled to have mixed with the seed various kinds of fertilizers, all being fed in the same proportion as it has been placed in box E.

As a cotton-cultivator, all the planting devices are removed. Two double-mold-board plows may be substituted for the single one shown in the drawings. The single-mold-board plows may also be reversed, so that the earth may be thrown to or from the center. The shovel $D^2$ is also removed and a cotton-scraper of any suitable size or shape is attached instead. In some cases a large double moldboard is placed on post C.

I am aware that it is not new to provide a seed-box with adjustable brushes at or near the bottom thereof; nor to employ a rotary device for drawing cotton-seed down through the opening at the bottom of a seed-box; nor in combining such a rotary device with a brush against and into which it works; and I therefore do not claim broadly any of the above devices or combinations of devices; but,

Having thus described my invention, what I claim as new, and desire to secure by Letters Patent, is—

In a cotton-planter, the combination of seed-box E, having slots $e$, with adjustable plates H H', screws $h$, brushes G G, and rotating arms $f^2$, said adjustable plates and brushes closing the bottom of said box, and said rotating arms operating up through said brushes along the meeting line thereof, substantially as set forth.

WASHINGTON C. THOMPSON.

Attest:
C. G. MILLER,
T. VAN KANNEL.